March 12, 1968 JAMES E. WEBB 3,373,404
ADMINISTRATOR OF THE NATIONAL AERONAUTICS
AND SPACE ADMINISTRATION
ERROR-CORRECTING METHOD AND APPARATUS
Filed Nov. 10, 1964 3 Sheets-Sheet 1

INVENTORS
GUSTAVE SOLOMON
JACK J. STIFFLER
TAGE O. ANDERSON
WARREN A. LUSHBAUGH
BY
ATTORNEYS

INVENTORS
GUSTAVE SOLOMON
JACK J. STIFFLER
TAGE O. ANDERSON
WARREN A. LUSHBAUGH
BY [signature]
ATTORNEYS March 12, 1968 JAMES E. WEBB 3,373,404
ADMINISTRATOR OF THE NATIONAL AERONAUTICS
AND SPACE ADMINISTRATION
ERROR-CORRECTING METHOD AND APPARATUS
Filed Nov. 10, 1964 3 Sheets-Sheet 3

INVENTORS
GUSTAVE SOLOMON
JACK J. STIFFLER
TAGE O. ANDERSON
WARREN A. LUSHBAUGH
BY [signature]
ATTORNEYS 3,373,404

ERROR-CORRECTING METHOD AND APPARATUS

James E. Webb, Administrator of the National Aeronautics and Space Administration, with respect to an invention of Gustave Solomon, Hollywood, Jack J. Stiffler, La Canada, Tage O. Anderson, Arcadia, and Warren A. Lushbaugh, Los Angeles, Calif.

Filed Nov. 10, 1964, Ser. No. 420,245
15 Claims. (Cl. 340—146.1)

ABSTRACT OF THE DISCLOSURE

An error-correcting system for use in a digital data communication system. The system comprises an encoding apparatus responsive to a digital data word for developing a maximal length shift register code word corresponding thereto. Means are also provided for deleting digits in selected positions of the developed code word to thus provide a punctured code word. This punctured code word is applied to the transmitting end of a communication channel which operates on the punctured code word to produce a received word at the receiving end of the channel. The channel may introduce random errors. Means are provided at the receiving end for developing a plurality of punctured cyclic permutations of the maximal length shift register code word. The received word is then compared with each of the punctured cyclic permutations.

The invention described herein was made in the performance of work under a NASA contract and is subject to the provisions of Section 305 of the National Aeronautics and Space Act of 1958, Public Law 85-568 (72 Stat. 435; 42 USC 2457).

This invention relates generally to digital data communication systems and more particularly to error-correcting methods and apparatus for encoding and decoding digital data.

As a consequence of the increased use of digital computers and data processing systems, the need for good digital communication systems has increased. The overall function of such systems, of course, is to accept information from a transmitting station and convey it to a receiving station without modification. Inasmuch as all physical communication channels are, as a practical matter, subjected to noise effects, it is often difficult to be sure that the received information is identical to the transmitted information. In order to minimize the likelihood that transmitted information is incorrectly interpreted at the receiving station, many different error-correcting procedures have been developed which considerably increase the likelihood of correct interpretation even in the presence of unfavorable noise conditions on the communication channel. One type of error-correcting procedure involves encoding the data at the transmitting station in accordance with an error-correcting code and then decoding the received information in accordance with the same code. Very briefly, many of these error-correcting codes are based on the premise that by properly choosing a code word dictionary or code block in which the words are sufficiently different from each other, the correct transmitted word can be selected from the dictionary even though the received word does not exactly match any of the words in the dictionary.

The subject of error-correcting codes is treated in detail by Peterson in his book entitled "Error-Correcting Codes," published jointly by the M.I.T. Press and John Wiley & Sons, Inc. In chapter I thereof, the author indicates that the book is primarily concerned with block codes and goes on to say:

"A *block code* is a code that uses sequences of $n$ channel symbols, or *n-tuples*. Only certain selected n-tuples, called code blocks or, more commonly, *code words*, are transmitted. At the receiver a decision is made, on the basis of the information in the received $n$-tuple, concerning the code word transmitted. This decision is a statistical decision; that is, it is of the nature of a best guess on the basis of available information but would not be infallible. With a good code, the probability of a wrong decision may be much smaller than the probability that the original channel input symbols are reproduced without error at the channel output."

The present invention relates to method and apparatus improvements for facilitating the use of error-correcting block codes.

It should be realized of course that if the code word dictionary has a relatively small number of entries and each of the entries is comprised of a relatively large number of digits, it could be very easy to select the proper dictionary word corresponding to a received word containing errors. It is of course inefficient however to make the entries any longer than is absolutely necessary. More particularly, since every actual communication channel has a definite capacity, if more digits are transmitted per word than are actually necessary, the rate at which words are transmitted over the channel is unnecessarily restricted.

In view of this, it is an object of the present invention to provide an improved method and apparatus for encoding and decoding in accordance with efficient error-correcting codes.

As an example, consider that the output of a data processing system, comprised of words having three binary digits or bits, is to be transmitted over a communication channel. Of course eight different words can be defined with three binary digits. If these words were put directly on the communication channel, loss of a single bit in any word would prevent the receiving station from ascertaining what word was actually transmitted. By encoding each of these eight words in accordance with some error-correcting code at the transmitting station, as by adding certain check bits to each three bit word, and by decoding in accordance with the same code at the receiving station, the transmitted word can be ascertained even if a bit is lost in the channel. As previously implied, it is desirable to use as few check bits as possible inasmuch as the rate of information transmission is inversely related to the number of check bits used. The rate can be defined as $k/n$ where $k$ represents the number of information bits in a data word and $n$ represents the total number of bits in a code word. Efficiency is of course proportional to rate and an error-correcting code that is 100% efficient, would only have to transmit three bits to represent three data bits. A code of this efficiency could not however correct any errors. As codes with decreasing efficiencies are selected, their error-correcting capabilities increase. Inasmuch as the noise effects to which a channel is subjected can vary from day to day and further, since the required correctness for any transmission can vary from message to message, it is desirable to provide error-correcting encoding and decoding apparatus which can operate in accordance with any one of a plurality of selected rates. Accordingly, it is a further object of the present invention to provide a method and apparatus which can be operated with any one of a plurality of selected rates.

A particular class of codes called maximal length shift register codes has proved to be very useful for error-correcting. These codes are discussed in chapter VIII of the above-cited book. Briefly, the maximal length shift register codes, for any $k$ are, by definition, formed by taking all of the cyclic permutations of a maximal length shift register sequence. Because these codes are so easily generated and because each of the code words is a cyclic shift of any one of the other words, rather efficient encoders and decoders can be developed.

The present invention is based upon the recognition that all optimal error-correcting $(n, k)$ codes for fixed $k$ and $k<n<2^k-1$ can be considered as codes "punctured" from a parent maximal length shift register code of length $2^k-1$. As a consequence, encoding and decoding apparatus useful for codes in which $n=2^k-1$ can also be used for codes having other $n$ values by providing a puncture program means which causes the punctured digits in the codes to be deleted from the encoding and decoding procedures. Thus, in accordance with the invention, a single apparatus which may be referred to as "A Punctured Systematic Cyclic Coder" is provided which, without significant change, is able to encode and decode data in accordance with codes having different rates and error-correcting abilities.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
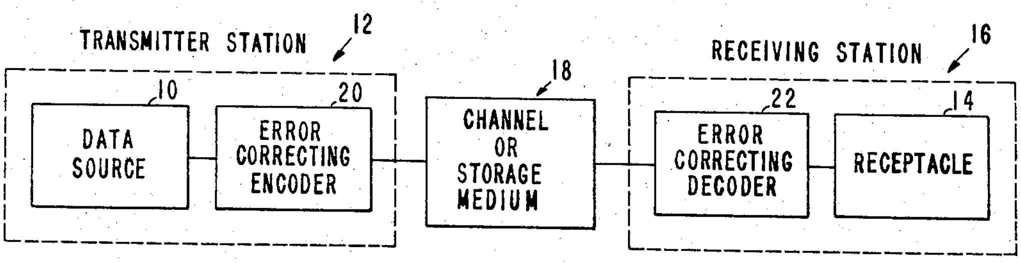
FIGURE 1 is a block diagram of a typical data communication system.

Attention is initially called to FIGURE 1 which generally illustrates a data communication system in which information is to be transmitted from a data source 10 at a transmitting station 12 to a data receptacle 14 at a receiving station 16 over a transmission channel 18. Since error causing noise effects can be encountered regardless of the exact physical configuration of the channel 18 or the distance separating the source 10 from the receptacle 14, the model of FIGURE 1 equally well represents an information storage system in which information is transmitted to some storage medium from a data source 10 and then later retrieved by a receptacle 14.

Ideally, the information received by the receptacle 14 should be identical to the information provided by the data source 10. However, as a practical matter, the channel or storage medium 18 is often subjected to environmental effects which modify the data being transmitted. In order to enable the receiving station to correctly interpret a received word even though that received word may contain errors, error-correcting systems are known in which the information provided by the data source 10 is encoded at the transmitting station 12 in accordance with an error-correcting code by an encoder 20. An error-correcting decoder 22 decodes the information provided by the channel 18 in accordance with the same error-correcting code utilized at the transmitting station. The present invention is directed toward improvements in a method and apparatus for encoding and decoding digital data to correct errors introduced therein.

For the sake of simplicity, the discussion of digital data herein will be restricted to binary data, but it is expressly pointed out that the techniques disclosed can be extended for use with digital systems having other radices.

The concept of the invention is based on the following lemma:

*Lemma.*—All $n$, $k$ block codes without repeated columns can be obtained by deleting or puncturing certain of the coordinates of a maximal length shift register code.

*Proof.*—Let G represent the $k\times2^k-1$ (see Table I in which $k=3$ has been assumed) matrix such that the rows of G are the generators of the $(2^k-1, k)$ maximal length shift register (or transorthogonal) code. It is well known that each of the $2^k-1$ non-zero $k$-tuples is represented once and only once by the columns of G. Hence, the columns of the generators G of any code which does not contain either repeated columns or the all-zero column must consist of a subset of these $k$-tuples. Those $k$-tuples which are not used may then simply be deleted from those of G.

TABLE I

| | | $k=3$ Rows 1 | 2 | 3 |
|---|---|---|---|---|
| $2^k-1=7$ Columns | #1 | 0 | 0 | 1 |
| | #2 | 1 | 0 | 0 |
| | #3 | 0 | 1 | 0 |
| | #4 | 1 | 0 | 1 |
| | #5 | 1 | 1 | 0 |
| | #6 | 1 | 1 | 1 |
| | #7 | 0 | 1 | 1 |
| | #1 | 0 | 0 | 1 |

Figure 2:
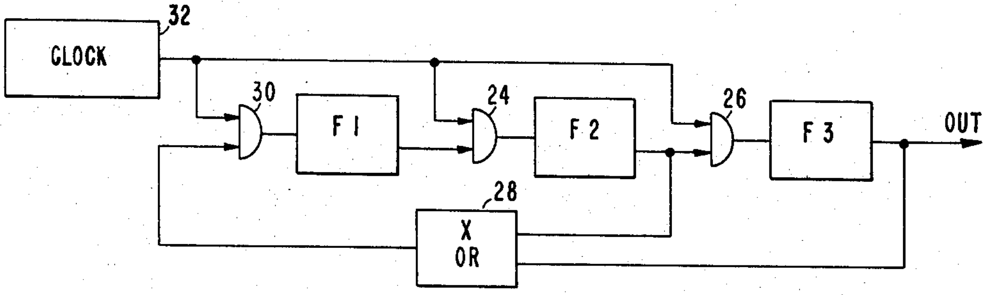
FIGURE 2 is a block diagram of an apparatus for generating maximal length shift register codes.

FIGURE 2 illustrates a maximal length shift register code generator which functions to successively define the states expressed by the columns of Table I. More particularly, the generator of FIGURE 2 is comprised of $k$ flip-flops (herein, $k=3$). The output of flip-flop F1 is connected through an And gate 24 to the input of flip-flop F2. The output of flip-flop F2 is connected to the input of an And gate 26 whose output is connected to the input of a flip-flop F3. The outputs of flip-flops F2 and F3 are connected to the input of an exclusive Or gate 28 whose output is connected to the input of And gate 30. The And gates 24, 26, and 30 are all enabled in response to the output of a clock source 32. Assuming that the flip-flops F1, F2, and F3 respectively initially define the state represented by column 1 of Table I, then the succeeding pulse provided by the clock source 32 will modify the flip-flop states to the word represented in column 2 of Table I, i.e. 100 respectively. Similarly, each clock pulse will change the contents of the flip-flops to that represented by the columns of Table I. The vertical rows of Table I represent cyclic permutations of a maximal length shift register code. Each cyclic permutation can be used as a dictionary code word. Thus, if the generator of FIGURE 2 initially stores the data word in column 1 of Table I, code word 1 of Table II will be initially generated at the output of the generator which is the output of flip-flop F3. Similarly, the data word of column 2 of Table I will initially generate code word 2 of Table II, etc.

TABLE II

| | Code Word |
|---|---|
| #1 | 1 0 0 1 0 1 1 |
| #2 | 0 0 1 0 1 1 1 |
| #3 | 0 1 0 1 1 1 0 |
| #4 | 1 0 1 1 1 0 0 |
| #5 | 0 1 1 1 0 0 1 |
| #6 | 1 1 1 0 0 1 0 |
| #7 | 1 1 0 0 1 0 1 |

Table II defines all of the code words in a maximal length shift register $(n, k)$ code where $k=3$ and $n=2^k-1=7$. It can be seen that the initial $k$ bits in each word comprise the data or information bits and thus the remaining $2^k-1-k$ bits comprise the check bits. It can be noted from Table II that all of the code words are cyclic permutations of each other. Likewise, they have the characteristic that the modulo 2 sum of any two of the code words forms another one of the code words; e.g.

$$\begin{array}{r} 1001011 \\ 0010111 \\ \hline 1011100 \end{array} \qquad (1)$$

Two other characteristics of maximal length shift register codes are also significant and should be noted:

(1) Each code word contains $2^{(k-1)}$ "1's."
(2) Each code word contains $2^{(k-1)}-1$ "0's."

Let the term "distance" ($d$) between a pair of words be defined as the weight (number of 1's) of the modulo 2 sum of the word; e.g. the distance between arbitrarily chosen seven bit words (not maximal length shift register codes) 0111010 and 1010101 is obtained as follows:

$$\begin{array}{r} 0111010 \\ 1010101 \\ \hline 1101111 \end{array} \qquad (2)$$

Thus, $d=6$.

For the maximal length shift register codes, the distance between any two different code words should of course be equal to $2^{k-1}$, i.e. the number of 1's in any code word since the modulo 2 sum of any code word is another code word. Let the fixed distance between two different code words be defined by $d_0$ so that for the code represented by Table II, $d_0=4$.

Assume that the data source 10 can provide any one of the seven data words illustrated in the columns of Table I to the error-correcting encoder 20 of FIGURE 1. Consider the situation where a word received by the decoder 22 exactly matches one of the code words; e.g.

$$\begin{array}{l} 1001011 \text{ (received word)} \\ 1001011 \text{ (code word)} \\ \hline 0000000 \text{ (modulo 2 sum)} \end{array} \qquad (3)$$

Thus, $d=0$.

It is noted and should be apparent that the distance between the received word and the correct code word is equal to zero. On the other hand, the distance between the received word and any other code word is equal to four; e.g.

$$\begin{array}{l} 1001011 \text{ (received word)} \\ 0010111 \text{ (code word)} \\ \hline 1011100 \text{ (modulo 2 sum)} \end{array} \qquad (4)$$

Thus, $d=d_0=4$.

Now assume that in the transmission of the desired code word, some noise is introduced in the communication channel and the word is received with one bit modified; e.g. 1011011 instead of 1001011.

By adding this received word to the code word it is intended to represent, a distance apart of one is obtained; e.g.

$$\begin{array}{l} 1011011 \text{ (received word)} \\ 1001011 \text{ (code word)} \\ \hline 0010000 \text{ (modulo 2 sum)} \end{array} \qquad (5)$$

Thus, $d=1$.

On the other hand, if the received word is added to another code word, it is seen that the words are a distance of at least three apart; e.g.

$$\begin{array}{l} 1011011 \text{ (received word)} \\ 0010111 \text{ (code word)} \\ \hline 1001100 \text{ (modulo 2 sum)} \end{array} \qquad (6)$$

Thus, $d=3$.

It should be apparent of course that the illustrated received word would be a distance of five from other code words.

Thus, the presence of a one bit error can be detected and corrected using a (7, 3) code. If there were two bit errors in the received word, it would be a distance of two apart from both the intended word and some of the other code words. In this case, of course, it would be impossible to correct both errors because there is no code word uniquely associated with the smallest distance from the received word. However, the mere fact that there are two errors in the received word would be apparent from the fact that it is at least a distance of two from every code word. Thus, a (7, 3) code is able to detect two errors but correct for only one error.

More generally, as long as the distance between a received word and a code word is less than $d_0/2$ where, as previously noted, $d_0=2^{k-1}$ in a $(2^k-1, k)$ code, the errors can be corrected and the proper code word selected. This can be seen from what has been said thus far inasmuch as the distance between a properly received word and any code word in a $(2^k-1, k)$ code should be between zero and $2^{k-1}$. As bit errors are introduced, the distance between the transmitted code word and the received word will increase from zero as the distance between the received word and other code words will decrease from $2^{k-1}$. Midway, i.e. at $d_0/2$ ($2^{k-1}/2$ herein), the received word could be the same distance from the transmitted code word as from other code words and thus correction would be impossible. Thus, the general technique of the present invention is to compare the received word successively with each code word to seek the code word which is a distance of less than $d_0/2$ from the received word. It should be apparent that for different $(n, k)$ codes, the distance $d_0$ will differ. As an example, Table III expresses $d_0$ for each of several different $(n, k)$ codes and, in addition, the number of errors ($e$) that can be corrected using that code.

TABLE III

| | $d_0$ | $e$ |
|---|---|---|
| (7,3) | 4 | 1 |
| (6,3) | 3 | 1 |
| (4,3) | 2 | 0 |
| (3,3) | 1 | 0 |
| (15,4) | 8 | 3 |
| (14,4) | 7 | 3 |
| (13,4) | 6 | 2 |

From Table III, it can be noted that a (6, 3) code will correct the same number of errors as the (7, 3) code but of course will be more efficient. Similarly, with the (14, 4) code and the (15, 4) code. The (6, 3) code can, for example, be formed by cancelling any vertical row in Table II inasmuch as this would result in a code in which $d_0=3$.

As previously pointed out, in accordance with the present invention, all $(n, k)$ codes are treated as punctured maximal length shift register codes. Thus, in encoding, a punctured sequence program is run along with a maximal length shift register generator of the type shown in FIGURE 2, to puncture the codes or in other words, cause some of the bits to be deleted from the transmitted word. Thus, the (6, 3) code can be developed from the conventional maximal length shift register generator shown in FIGURE 2.

In decoding, as the received word comes in, the modulo 2 sum for the received word and each of the code words is successively derived. A determination is then made as to which code word is the smallest distance from the received word and this code word is selected as being the transmitted code word.

Figure 3:
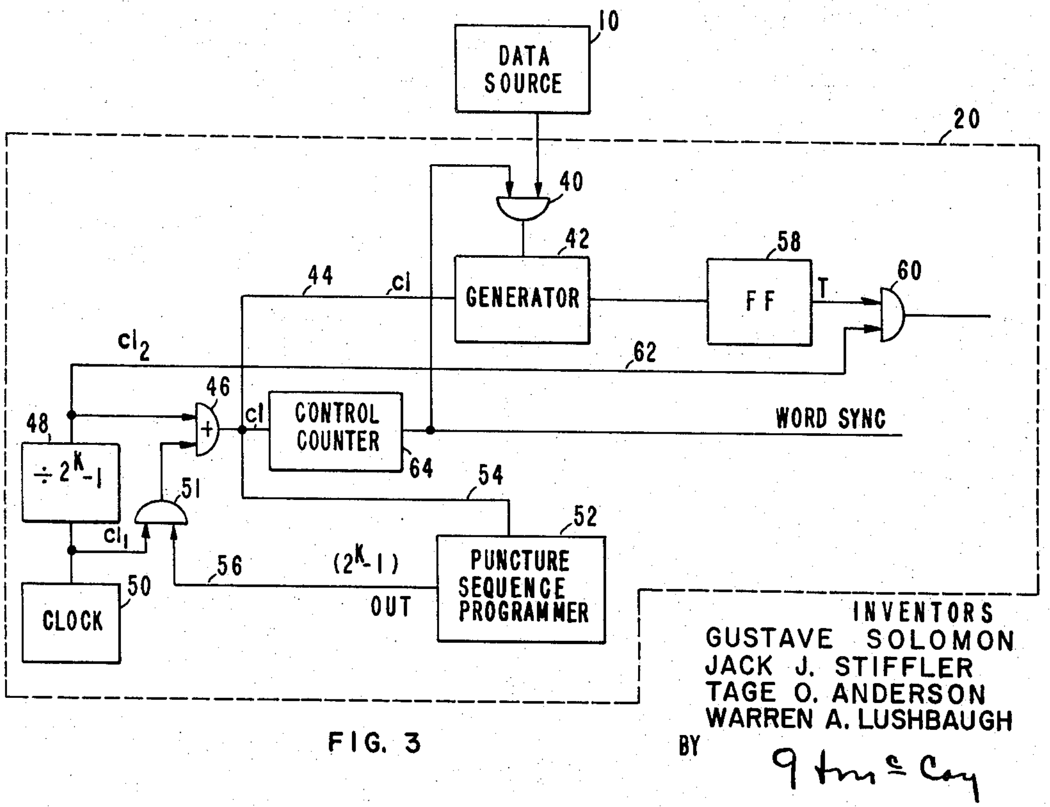
FIGURE 3 is a block diagram of an encoding apparatus in accordance with the present invention.

Attention is now called to FIGURE 3 which illustrates a preferred implementation of an encoder in accordance with the present invention. The output of the data source 10 is connected to the input of an And gate 40 in the encoder 20. The output of the And gate 40 is connected to the input of a maximal length shift register code generator 42 which can be implemented as shown in FIGURE 2. The data source 10 can thus supply a word of $k$ bits, e.g. a data word in one of the columns of Table I, to the generator 42. In response to clock pulses coupled thereto on conductor 44, the generator 42 will provide a maximal length shift register code word having $2^k-1$ bits at its output. As noted, if word 1 in Table I were entered into the generator 42, it would provide code word 1 of Table II at its output. The clock pulse conductor 44 is connected to the output of an Or gate 46 which can deliver pulses from either one of two sources. More particularly, the first input to Or gate 46 is derived from a divider circuit 48 which divides the output ($Cl_1$)

of a clock source 50 by $(2^k-1)$ to provide clock pulses ($Cl_2$) at a slower rate. The second input to Or gate 46 is derived from an And gate 51 which, when enabled, provides clock pulses ($Cl_1$) directly from the clock 50. Thus, when And gate 51 is enabled, clock pulses ($Cl_1$) will be provided to the generator 42 at a rate $(2^k-1)$ times greater than when the And gate 51 is disabled. The And gate 51 is controlled by the output of a puncture sequence programmer 52. The puncture sequence programmer 52 can comprise a shift register which stores a "1" bit in each of the bit positions to be deleted or punctured from the maximal length shift register code. The contents of the puncture sequence programmer 52 is shifted in response to the output of the gate 46 applied to conductor 54. When the puncture sequence programmer provides a "1" bit on its output conductor 56 coupled to the input of gate 51, a clock pulse ($Cl_1$) of the faster clock rate is applied from clock source 50 to the generator 42. The output of the generator 42 is coupled to the input of a single flip-flop 58. The output of the flip-flop 58 is gated through an And gate 60 in response to a clock pulse ($Cl_2$) provided on conductor 62 by the output of the divider 48. Thus, so long as the puncture sequence programmer 52 provides "0" bits, the generator 42 will continue to provide bits of the maximal length shift register code word to the flip-flop 58 which bits will then be gated through the gate 60 at each clock pulse ($Cl_2$). When, however, the puncture sequence programmer 52 provides "1" bit outputs, the punctured bit will be provided to the flip-flop 58 considerably prior to the divider 48 providing a pulse ($Cl_2$). When the divider 48 next provides a clock pulse ($Cl_2$) to the gate 60, the gate will output the next unpunctured bit.

The output of gate 46 is also connected to the input of a control counter adapted to count up to $2^k-1$. When the control counter reaches its maximum count, it enables the gate 40 to thus cause another word to be transferred from the data source into the generator 42. The output of the control counter 64 is also utilized as a word sync pulse by the decoding equipment as will be discussed hereinafter.

It should be appreciated that whereas a duration defined by seven clock pulses ($Cl_2$) from the divider 48 is necessary to output a code word of a (7, 3) code, a duration defined by only six pulses from the divider 48 is necessary to output a code word of a (6, 3) code. Thus, the encoder apparatus of FIGURE 3 is able to encode data in accordance with codes of different efficiencies merely by modifying the contents of the puncture sequence programmer 52. As previously noted, the determination of what code should be utilized at any time is based on several considerations including the current reliability of the channel, the transmission accuracy desired, etc.

Figure 4:
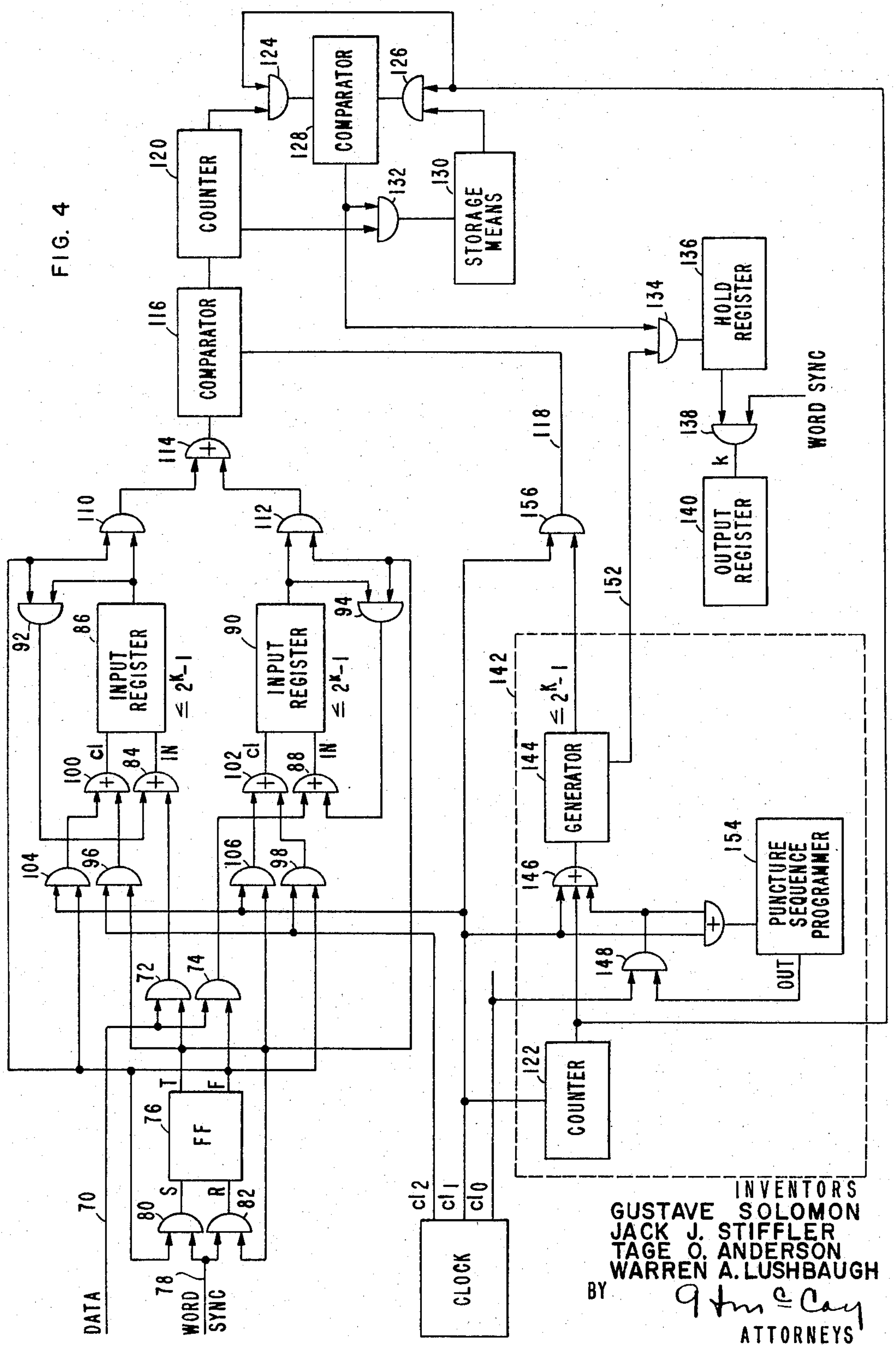
FIGURE 4 is a block diagram of a decoding apparatus in accordance with the present invention.

Attention is now called to FIGURE 4 which illustrates a decoding apparatus for decoding data received from the output of And gate 60 of FIGURE 3. The data is coupled by a conductor 70 to the input of And gates 72 and 74. And gate 72 is enabled when flip-flop 76 defines a true state and And gate 74 is enabled when flip-flop 76 defines a false state. The word sync line 78 derived from the output of the control counter of FIGURE 3 is connected to the input of And gates 80 and 82 whose outputs are respectively connected to the set and reset input terminals of the flip-flop 76. The second input to each of And gates 80 and 82 is respectively derived from the false and true output terminals of the flip-flop 76. Thus, the flip-flop 76 changes state in response to each pulse provided by the control counter 64 of FIGURE 3. Thus, the data is alternately gated through gates 72 and 74. Gate 72 is connected to the input of an Or gate 84 whose output is connected to the input of an input register 86. The output of gate 74 is similarly connected to the input of Or gate 88 whose output is connected to the input of a second input register 90. Thus, words received over the communication channel are alternately entered into the input registers 86 and 90. When a word is not being entered into the input register, the word stored therein is being successively compared with each maximal length shift register code word to determine which code word is the smallest distance from the received word. When the flip-flop 76 is false and the received word is being entered into the input register 90, the information in register 86 is being recirculated through And gate 92 whose output is connected to the input of previously mentioned Or gate 84. On the other hand, when flip-flop 76 is true and data is being entered into the input register 86, the contents of the input register 90 are being recirculated through gate 94 whose output is connected to the input of gate 88. When information is being entered into the registers 86 and 90, the contents thereof are shifted at the same rate as bits are provided by the gate 60 of FIGURE 3. Thus, the output of clock 50 ($Cl_1$) divided by $(2^k-1)$ ($Cl_2$) is connected to the input of gates 96 and 98. The outputs of gates 96 and 98 are respectively connected to the inputs of Or gates 100 and 102 whose outputs are respectively connected to the clock input terminals of the registers 86 and 90. Thus, when flip-flop 76 is true, the clock pulses are applied at a slow rate ($Cl_2$) through gate 96 to the register 86. On the other hand, when the flip-flop 76 is false, the clock pulses are applied at a slow rate ($Cl_2$) to the input register 90. Whereas the contents of the registers 86 and 90 are shifted at a relatively slow rate when information is being entered therein, when it is being successively compared with the code words, the high frequency clock pulses ($Cl_1$) are respectively applied through gates 104 and 106 to the registers 86 and 90.

The outputs of the registers 86 and 90 are respectively connected through And gates 110 and 112 to the input of an Or gate 114 whose output is connected to the input of a comparator 116. During the time that a new data word is being entered into one of the registers, e.g. register 90, the contents of the register 86 is compared with every code word in the dictionary, the code words being generated on conductor 118 coupled to the comparator 116. The comparator 116 includes an exclusive Or or half adder circuit which provides a "1" output pulse whenever the bits coupled thereto differ. These output pulses are cumulatively counted by a counter 120, to thus develop the distance between the received word and each code word.

In order to understand the operation of the equipment thus far recited, consider that a word sync pulse arrives on conductor 78 to switch the flip-flop 76 to a false state. As a consequence, the input register 86 will start successively providing bits of the previously received word to the comparator 116. In synchronism therewith, bits of the code words will be provided on conductor 118 to the comparator 116. For each cycle of the input register, one code word is provided on conductor 118. The input register 86 will cycle $2^k-1$ times between word sync pulses in order that each of the code words can be compared with the received word.

A counter 122 is provided to count the output pulses provided by clock 50 and to provide a single output pulse for each cycle of the registers. Thus, after the received word is compared with each code word, the counter 122 provides an output pulse. The output of counter 122 is connected to the input of each of And gates 124 and 126. The outputs of And gates 124 and 126 are connected to the input of a second comparator 128. The second inputs to And gates 124 and 126 are respectively derived from the output of the previously mentioned counter 120 and the output of a storage means 130 which stores the previous smallest distance between the received word and a code word. That is, when the counter 122 provides an output pulse at the end of each cycle, the counter 120 will store a number representing the distance between the received word and the code word just compared with the received word. The comparator 128 will compare the distance expressed by the count in counter 120 with the distance stored in means 130 which expresses the smallest previous difference between the received word and a code word. If the distance defined by counter 120 is smaller than the distance stored in the storage means 130, the comparator 128 will enable gate 132 to transfer the contents of the counter 120 to the storage means 130. In addition, the comparator 120 will enable gate 134 to transfer the data bits, i.e. the initial $k$ bits in the code word associated with the smallest distance being transferred to the storage means 130, to an intermediate hold register 136. The output of the intermediate hold register 136 is connected to the input of And gate 138 whose output is connected to the input of the output register 140. The gate 138 is enabled in response to the word sync pulse to transfer the contents of the register 136 to the register 140 after a received word has been compared with all the code words.

The code word generator 142 for successively providing the code words on the conductor 118, includes a maximal length shift register generator 144 which can be of the type shown in FIGURE 2 and similar to generator 42 of FIGURE 3. The clock input terminal of the generator 144 is connected to the output of Or gate 146 to which pulses can be fed at the normal clock rate ($Cl_1$) or at a rate $2^k-1$ times greater than the normal clock rate [i.e. $(2^k-1)\ Cl_1=Cl_0$] if gate 148 is enabled. In addition, the output of counter 122 is connected to the input of gate 146 for shifting the output of generator 144 one bit relative to the contents of the input registers after each different maximal length shift register cyclic permutation or code word is compared with a received word.

The output of the last stage of generator 144 is coupled to the input of a gate 156 whose output is connected to the input of the comparator 116. The outputs from the $k$ stages of the generator 144 are coupled to conductor 152 which is connected to the input of gate 134.

Assuming initially that the system is operating on unpunctured codes, i.e. a $(2^k-1, k)$ code, a received word will be compared with each code word in $2^k-1$ clock periods ($Cl_1$) inasmuch as each word contains $2^k-1$ bits. After the $2^k-1$ bits of a code word are compared with the corresponding bits of the received word, the counter 122 will shift the contents of generator 144 to then let a subsequent permutation be compared with the received word. Since each received word is compared with $2^k-1$ code words, a total of $(2^k-1)^2$ clock periods ($Cl_1$) is required to determine the code word identified by the received word. During this time, the other input register is being loaded. That is, it will be recalled that one bit is delivered by And gate 60 for each $2^k-1$ clock pulses ($Cl_1$) and a total of $2^k-1$ clock bits must be delivered over the communication channel. Accordingly, it also takes $(2^k-1)^2$ clock periods ($Cl_1$) to enter a new received word into an input register. It should be realized that no harm is done if it takes longer to enter new received words since the received word being compared will continue to be compared, but of course will not modify the contents of the register 136 storing the already located correct code word.

When punctured codes, i.e. $(n, k)$ where $n<2^k-1$ are used, the length of the input registers 86 and 90 is reduced to $n$. A puncture sequence programmer 154 similar to programmer 52 of FIGURE 3, is provided with "1" bits in each of the bit positions to be punctured. The output of the puncture sequence programmer 154 is connected to the input of gate 148 which, when enabled, couples clock pulses ($Cl_0$) at a rate $2^k-1$ times the normal clock rate ($Cl_1$) to both the gate 146 and Or gate 147. Inasmuch as the output of the generator 144 is coupled through an And gate 156 gated by the normal clock rate ($Cl_1$) to the conductor 118, corresponding bit positions from each of the code words will be deleted, that is, will not be gated through 156 to the comparator 116 when the puncture sequence programmer 154 is being shifted by the $Cl_0$ clock pulses. Programmer 154 is normally shifted by the $Cl_1$ clock pulses when the programmer 154 output is "0." Thus, each of the received punctured words will be compared with a punctured code word in the same manner as the unpunctured code words are compared. The counter 120, comparator 128 and storage means 130 of course operate similarly to determine which of the punctured code words is closest to the punctured received word and that code word is ultimately entered into the output register 140.

An assumption has been tacitly made thus far that no use would be made of an all 0's data word because its corresponding code word is similarly comprised of all "0's" and thus is not a cyclic permutation of the other code words. Since the decoding procedure which has been described involves comparing each received word with every cyclic permutation provided by generator 144 and since this generator will not provide an all 0's word, the apparatus of FIGURE 4 must be modified if an all 0's word is to be handled. It is of course desirable that the system be capable of handling an all 0's word since this permits $2^k$ rather than $2^k-1$ different words to be used.

Figure 5:
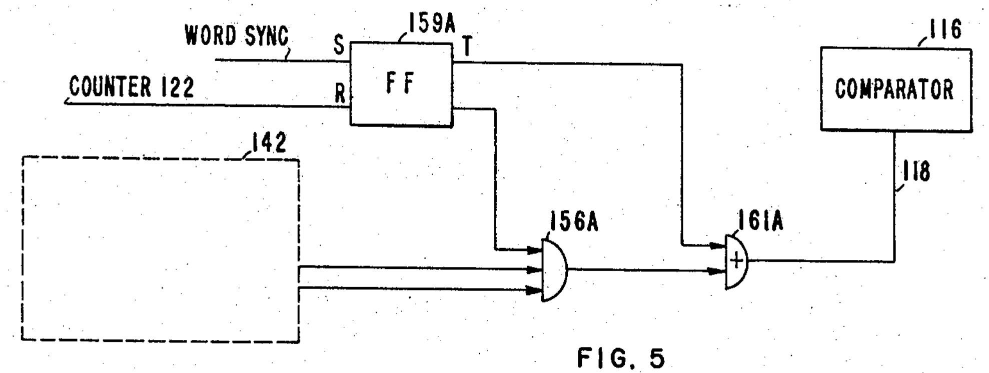
FIGURE 5 is a block diagram of a modified decoding apparatus.

The modifications to FIGURE 4 necessary to decode an all "0's" word are shown in FIGURE 5. Essentially they involve merely applying "0's" to the camparator 116 for $2^k-1$ clock pulses ($Cl_1$) after the word sync pulse and during this period inhibiting the coupling between gate 156 of FIGURE 4 and the comparator 116. After these initial $2^k-1$ pulses, the apparatus can function as described in FIGURE 4. It is of course necessary however that the word sync pulses be spaced by a greater interval in FIGURE 5 in order to permit the received word to be compared with $2^k$ rather than $2^k-1$ code words.

More specifically, the modifications illustrated in FIGURE 5 involve providing a 0 word flip-flop 159A which is set true in response to a word sync pulse. The false output terminal of flip-flop 159A is connected to the input of And gate 156A which corresponds to the gate 156 of FIGURE 4. The output of gate 156A, along with the true output terminal of the flip-flop 159A, is connected to the input of Or gate 161A. The output of Or gate 161A is connected through previously mentioned conductor 118 to the comparator 116. The other two inputs to And gate 156A are derived from the generator 142 in the same manner as in FIGURE 4. The reset input terminal of the flip-flop 159A is connected to the output of the counter 122 of FIGURE 4.

Let it be asumed that a true binary signal is representative of a "0" bit. Consequently, in response to a word sync pulse, the 0 word flip-flop 159A will be set to thus couple a true signal to comparator 116 for $2^k-1$ clock pulses ($Cl_1$). The And gate 156A will be disabled during this interval although in fact, this would not be necessary since the gate 161A would provide a true output signal during this period regardless of the inputs to gate 156A. After the received word has been compared with the $2^k-1$ "0's," the counter 122 will reset the flip-flop 159A to thus effectively remove it from the system until the succeeding word sync pulse. The received word is then compared with each of the code words as aforedescribed in FIGURE 4.

It should be apparent from the foregoing that it takes as long to decode a correctly transmitted word as an incorrectly transmitted word. The described system can further be modified to favor correctly transmitted words by continually sensing the contents of the storage means 130 which will, during the decoding of any received word, store the distance between the received word and the closest code word thus far compared. Whenever the storage means 130 stores a distance $<d_0/2$, it of course means that the correct code word has been found and that further comparisons with this received word are unnecesary. A "ready" signal can then be generated to indicate that the decoding equipment is ready to accept another word.

It is pointed out that the decoding apparatus embodiment of FIGURE 4 makes the assumption that the generator 144 can be driven at a frequency $(2^k-1)$ greater than the normal frequency $Cl_1$. In order to transmit information over the channel at the maximum rate, it would be desirable to normally drive generator 144 and the input registers 86, 90 at their maximum rates and thus in an optimum system, it would not be possible to drive the generator 144 faster to puncture the code words.

Figure 6:
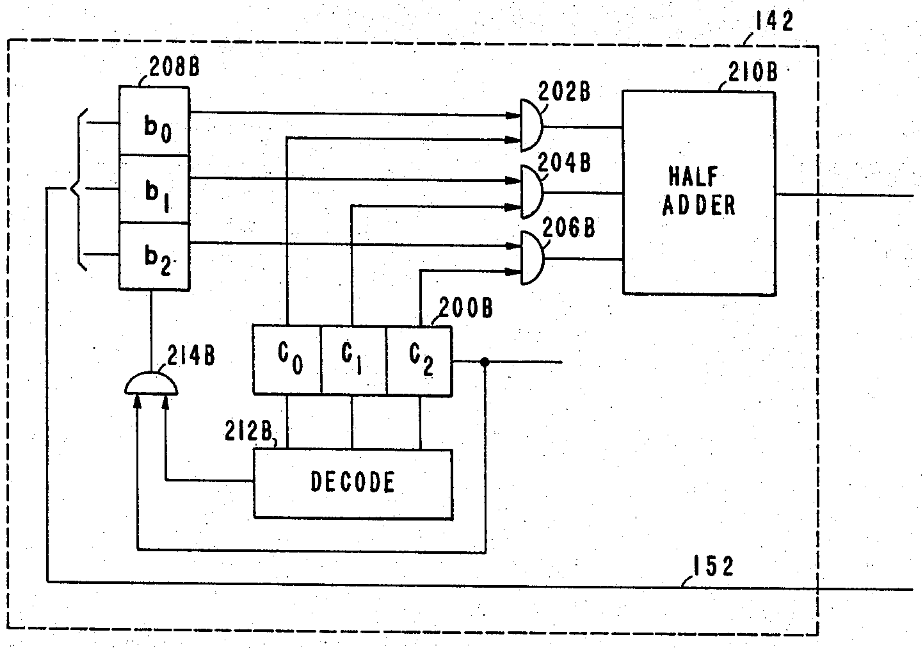
FIGURE 6 is a block diagram of a still further decoding apparatus embodiment.

In view of this, an alternative and preferred embodiment of decoding apparatus is shown in FIGURE 6 which incorporates a different means for developing the code words to be compared with each received word.

The embodiment of FIGURE 6 is based upon the following analysis. When a received word of length $n<2^k-1$ is circulating in the input register, it is necessary to compare each bit of the received word with the correspondingly positioned bit in each code word. For example, in a certain (60, 6) code, the 7th, 8th, and 13th bits or components of the (63, 6) code have been punctured so that the 7th component of the received punctured word must be compared with the 9th component in each of the unpunctured code words. As a simpler example, consider that the 6th bit has been punctured from a (7, 3) code. Let any code word $b_n$ be represented thusly:

$$b_n=b_0, b_1, b_2, b_3, b_4, b_5, b_6$$

From what has been said thus far, it should be appreciated that the component $b_3$ represents the modulo 2 sum of $b_0$ and $b_1$; i.e. $b_3=b_0\oplus b_1$. Similarly, $$b_4=b_1\oplus b_2$$
$$b_5=b_2\oplus b_3=b_2\oplus b_0\oplus b_1$$
$$b_6=b_3\oplus b_4=b_0\oplus b_1\oplus b_1\oplus b_2$$

and since $b_1\oplus b_1=0$ $$b_6=b_0\oplus b_2$$

Thus, each code word bit or component can be represented in terms of the modulo 2 sum of logical products ("and") of constants and components $b_0$, $b_1$, $b_2$. That is, $$b_0=C_0b_0\oplus C_1b_1\oplus C_2b_2$$

where $C_0=1$ and $C_1$, $C_2=0$.

$$b_1=C_0b_0\oplus C_1b_1\oplus C_2b_2$$

where $C_1=1$ and $C_0$, $C_2=0$.

$$b_2=C_0b_0\oplus C_1b_1\oplus C_2b_2$$

where $C_2=1$ and $C_0$, $C_1=0$.

$$b_3=C_0b_0\oplus C_1b_1\oplus C_2b_2$$

where $C_0$, $C_1=1$ and $C_2=0$.

$$b_4=C_0b_0\oplus C_1b_1\oplus C_2b_2$$

where $C_1$, $C_2=1$ and $C_0=0$.

$$b_5=C_0b_0\oplus C_1b_1\oplus C_2b_2$$

where $C_0$, $C_1$, $C_2=1$.

$$b_6=C_0b_0\oplus C_1b_1\oplus C_2b_2$$

where $C_0$, $C_2=1$ and $C_1=0$.

Table IV summarizes the above equations.

TABLE IV

| | $C_0$ | $C_1$ | $C_2$ | |
|---|---|---|---|---|
| $b_0$ | 1 | 0 | 0 | (State 0) |
| $b_1$ | 0 | 1 | 0 | (State 1) |
| $b_2$ | 0 | 0 | 1 | (State 2) |
| $b_3$ | 1 | 1 | 0 | (State 3) |
| $b_4$ | 0 | 1 | 1 | (State 4) |
| $b_5$ | 1 | 1 | 1 | (State 5) |
| $b_6$ | 1 | 0 | 1 | (State 6) |

By constructing a counter comprised of stages $C_0$, $C_1$, $C_2$ to successively define the desired states, i.e. by deleting from the counter sequence those states corresponding to punctured or deleted bits or components, the desired punctured code words can be generated. Thus, if the sixth bit, $b_5$, is to be deleted, the counter can be constructed so as not to define state 5 (i.e. 111).

Attention is now called to FIGURE 6 which illustrates a code word generator for sequentially supplying either punctured or unpunctured code words to the comparator 128 for comparison with received words. The code word generator of FIGURE 6 can be substituted for the generator 142 of FIGURE 4 and includes a C counter 200B comprised of binary stages $C_0$, $C_1$, $C_2$. In response to each clock signal $Cl_1$, the counter 200B changes state, successively defining all 7 states of Table IV if unpunctured words are being processed. In the event the code words are to be punctured so as to delete the sixth bit or component of each code word, the counter 200B is caused to be a scale of six counter defining all but state 5 of Table IV. The outputs from stages $C_0$, $C_1$, $C_2$ are respectively connected to the inputs of And gates 202B, 204B, 206B. The second inputs to the And gates are respectively derived from stages $b_0$, $b_1$, $b_2$ of a scale of $2^k$ (herein, eight) $b$ counter 208B. The outputs from gates 202B, 204B, 206B are connected to the inputs of a half adder 210B which provides their modulo 2 sum to the comparator 128. The $b$ counter is incremented once for each cycle of C counter. The completion of a C counter cycle is sensed by a decoding means 212B which provides a signal to gate 214B whose output increments the $b$ counter.

Thus, by using the arrangement of FIGURE 6, the deleted digits in each code word are never generated and accordingly, a faster than normal clock rate is not required meaning that the normal clock rate can be made equal to the maximum rate of the equipment employed. An additional advantage of the embodiment of FIGURE 6 is that the all zero code is automatically generated if the $b$ counter is made a scale of $2^k$ counter as proposed.

From the foregoing, it should be appreciated that a method and apparatus has been disclosed herein for correcting errors introduced in digital data between a transmitting and a receiving station. The invention makes it possible for a system to be easily modified so as to selectively define desired data rates and error-correcting abilities in accordance with the condition of the communication channel. That is, in FIGURE 6, it is only necessary to change the lengths of the input registers and the counting sequence of C counter 200B to change the data rate and error-correcting abilities.

Although several embodiments of the invention have been specifically shown herein, it is pointed out that still other variations should be apparent to those skilled in the art. For example only, data transfers and comparisons could be made in parallel, rather than in series as shown, if desired. A significant increase in speed could thus be obtained for the cost of additional hardware.

What is claimed is:

1. A system for correcting errors introduced in transmitted digital data comprising an encoding apparatus responsive to a digital data word for developing a maximal length shift register code word corresponding thereto; means for deleting digits in selected positions of said developed code word to thus develop a punctured code word; transfer means operating on said punctured code word to produce a received word including randomly introduced errors; means for developing a plurality of punctured cyclic permutations of said maximal length shift register code word punctured by the deletion of digits in said selected positions; and means for comparing said received word with each of said plurality of punctured cyclic permutations.

2. A system for correcting errors introduced in transmitted digital data comprising an encoding apparatus responsive to a digital data word for developing a maximal length shift register code word corresponding thereto; means for deleting digits in selected positions of said developed code word to thus develop a punctured code word; transfer means operating on said punctured code word to produce a received word including randomly introduced errors; means for developing a plurality of punctured cyclic permutations of said maximal length shift register code word punctured by the deletion of digits in said selected positions; comparing means for determining the distance between said received word and each of said plurality of punctured cyclic permutations; means for indicating which of said punctured cyclic permutations is the minimum distance from said received word; and means for interpreting said received word as the punctured cyclic permutation which is the minimum distance therefrom.

3. The system of claim 2 including a puncture sequence programmer means defining said selected positions; and gating means responsive to said puncture sequence programmer means for passing all digits of said developed code word except those in said selected positions.

4. The system of claim 2 including a puncture sequence programmer register having a number of digit positions equal to the number of digits in said code word; means for defining a first state in each programmer register digit position corresponding to said selected code word position; a gating means; means in said encoding apparatus for sequentially applying said code word digits to said gating means; and means for sequentially coupling said programmer register digit positions to said gating means for effectively disabling said gating means when a first state is defined in the programmer register position coupled thereto.

5. The system of claim 2 including an input register for storing said received word, said input register having a number of digit positions equal to the number of digits in said received word; means for cyclically and sequentially providing said received word digits stored in said input register; said means for developing punctured cyclic permutations including generator means for defining a different cyclic permutation during each cycle of said input register and for sequentially providing the digits of said defined cyclic permutation; said comparing means being responsive to said digits provided by said input register and said generator means.

6. The system of claim 5 including a counter responsive to said comparing means for counting the number of digits provided by said input register which do not match the corresponding digits provided by said generator means; a storage means; a hold register; means for comparing the count in said counter with the contents of said storage means after each input register cycle; and transfer means, responsive to said means for comparing the count in the event said count is lower, for transferring said count to said storage means and the corresponding cyclic permutation to said hold register.

7. In a digital data communication system including a channel for carrying information from a data source to a data receptacle, error-correcting apparatus including an encoding means coupling said data source to said channel and a decoding means coupling said channel to said data receptacle; said encoding means being responsive to a $k$ digit code provided by said data source for developing a maximal length shift register code word corresponding thereto; means in said encoding means for coupling said developed maximal length shift register code word to said channel and for puncturing said code word by deleting selected digits therefrom; said decoding means including means for developing cyclic permutations of said maximal length shift register code word and for puncturing said cyclic permutations by deleting therefrom digits corresponding to those digits deleted in said encoding means; and means in said decoding means for comparing a word applied thereto by said channel with different punctured cyclic permutations of said maximal length shift code word and for indicating which of said punctured cyclic permutations is the minimum distance therefrom.

8. The system of claim 7 wherein said maximal length shift register code word is comprised of $2^k-1$ digits and said punctured code word is comprised of $n$ digits where $k \leq n \leq 2^k-1$.

9. In a digitial data communication system including a channel for carrying information from a data source to a data receptacle, error-correcting apparatus including an encoding means coupling said data source to said channel and a decoding means coupling said channel to said data receptacle; said encoding means including sources of relatively high and low frequency clock pulses; a maximal length shift register code word generator; a puncture sequence programmer register having a number of stages equal to the number of digits in one of said code words; means defining a first state in selected programmer register stages; means normally responsive to said low frequency clock pulses for sequentially accessing said stages of said programmer register and for driving said generator to sequentially provide digits of a code word; means responsive to accessing a stage of said programmer register defining a first state for driving said programmer register and said generator in response to said high frequency clock pulses; a gating means responsive to said low frequency clock pulses for coupling said digits provided by said generator to said channel; said decoding means including means for developing cyclic permutations of said maximal length shift register code word and for puncturing said cyclic permutations by deleting therefrom digits corresponding to those digits deleted in said encoding means; means in said decoding means for comparing a word applied thereto by said channel with different punctured cyclic permutations of said maximal length shift code word and for indicating which of said punctured cyclic permutations is the minimum distance therefrom.

10. In a digital data communication system including a channel for carrying information from a data source to a data receptacle, error-correcting apparatus including an encoding means coupling said data source to said channel and a decoding means coupling said channel to said data receptacle; said encoding means being responsive to a $k$ digit code provided by said data source for developing a maximal length shift register code word corresponding thereto; means in said encoding means for coupling said developed maximal length shift register code word to said channel and for puncturing said code word by deleting selected digits therefrom; said decoding means including generator means for sequentially providing different cyclic permutations of said code word, correspondingly punctured, and for providing digits of said punctured code words in sequence; said generator means including first and second counters; a source of clock pulses; said first counter being responsive to said clock pulses for successively and cyclically defining a plurality of different states each corresponding to a different undeleted code word digit; said second counter capable of cyclically defining $2^k$ different states, each state defining a different one of said cyclic permutations; means for incrementing said second counter in response to each cycle of said first counter; logical means responsive to each state of said second counter for sequentially providing digits of a different punctured cyclic permutation; and means for comparing a word coupled to said decoding means by said channel with said different cyclic permutations for indicating which permutation is the minimum distance therefrom.

11. In a digital data communication system including a channel for carrying information from a data source to a data receptacle, error-correcting apparatus including an encoding means coupling said data source to said channel and a decoding means coupling said channel to said data receptacle; said encoding means including sources of relatively high and low frequency clock pulses; a maximal length shift register code word generator; a puncture sequence programmer register having a number of stages equal to the number of digits in one of said code words; means defining a first state in selected programmer register stages; means normally responsive to said low frequency clock pulses for sequentially accessing said stages of said programmer register and for driving said generator to sequentially provide digits of a code word; means responsive to accessing a stage of said programmer register defining a first state for driving said programmer register and said generator in response to said high frequency clock pulses; a gating means responsive to said low frequency clock pulses for coupling said digits provided by said generator to said channel; said decoding means including generator means for sequentially providing different cyclic permutations of said code word, correspondingly punctured, and for providing digits of said punctured code words in sequence; said generator means including first and second counters; a third clock source providing pulses at said relatively high frequency; said first counter being responsive to said third source clock pulses for successively and cyclically defining a plurality of different states each corresponding to a different undeleted code word digit; said second counter capable of cyclically defining $2^k$ different states, each state defining a different one of said cyclic permutations; means for incrementing said second counter in response to each cycle of said first counter; logical means responsive to each state of said second counter for sequentially providing digits of a different punctured cyclic permutation; and means for comparing a word coupled to said decoding means by said channel with said different cyclic permutations for indicating which permutation is the minimum distance therefrom.

12. In a digital data communication system including a channel for carrying information from a data source to a data receptacle, error-correcting apparatus including an encoding means coupling said data source to said channel and a decoding means coupling said channel to said data receptacle; said encoding means being responsive to a *k* digit code provided by said data source for developing a maximal length shift register code word corresponding thereto; means in said encoding means for coupling said developed maximal length shift register code word to said channel and for puncturing said code word by deleting selected digits therefrom; said decoding means including a first input register for storing the word coupled thereto by said channel; generator means for sequentially providing different cyclic permutations of said code word, correspondingly punctured, and for providing digits of said punctured code words in sequence; said generator means including first and second counters; a source of clock pulses; means for cyclically and sequentially accessing digits from said first input register in response to said clock pulses; said first counter being responsive to said clock pulses for successively and cyclically defining a plurality of different states each corresponding to a different undeleted code word digit; said second counter capable of cyclically defining $2^k$ different states, each state defining a different one of said cyclic permutations; means for incrementing said second counter in response to each cycle of said first counter; logical means responsive to each state of said second counter for sequentially providing digits of a different punctured cyclic permutation; means for comparing said digits accessed from said first input register with said digits provided by said logical means and for indicating the number of mismatches during each state of said second counter; and means for identifying the permutation containing the fewest digits mismatching the corresponding digits in said first input register.

13. The system of claim 12 including a second input register; means for alternately storing words coupled to said decoding means by said channel in said first and second input registers; and means for alternately comparing the digits in said first and second input registers with said digits provided by said logical means.

14. The system of claim 12 wherein said maximal length shift register code word is comprised of $2^k-1$ digits and said punctured code word is comprised of $n$ digits where $k \leqslant n \leqslant 2^k-1$.

15. The system of claim 14 wherein said first input register comprises a shift register having a variable number of stages equal to *n* and wherein said first counter is connected so as to define *n* different states.

References Cited

UNITED STATES PATENTS

| | | | |
|---|---|---|---|
| 3,078,443 | 2/1963 | Rose | 340—146.1 |
| 3,155,818 | 11/1964 | Goetz | 340—347 |

MALCOLM A. MORRISON, *Primary Examiner.*

C. E. ATKINSON, *Assistant Examiner.*